United States Patent [19]

Ilzhöfer et al.

[11] Patent Number: 5,851,152
[45] Date of Patent: Dec. 22, 1998

[54] DRIVE SHAFT WITH REINFORCED PLASTIC TUBE AND A JOINT-CONNECTING BODY CONNECTED NONROTATABLY ENDWISE

[75] Inventors: Karl-Heinz Ilzhöfer, Kirchheim; Bertold Ediger, Backnang; Harmut Albers, Stuttgart; Dittmar Wieland, Oppenweiler; Dieter Kandert, Wiernsheim, all of Germany

[73] Assignee: Mercedes-Benz AG, Stuttgart, Germany

[21] Appl. No.: 829,957

[22] Filed: Apr. 1, 1997

[30] Foreign Application Priority Data

Apr. 6, 1996 [DE] Germany ............ 196 13 857.4

[51] Int. Cl.⁶ ..................................... F16C 3/00
[52] U.S. Cl. ............................ 464/181; 464/183
[58] Field of Search ...................... 464/179, 181, 464/182, 183, 903

[56] References Cited

U.S. PATENT DOCUMENTS

| | | |
|---|---|---|
| 3,638,455 | 2/1972 | Francois . |
| 3,750,489 | 8/1973 | Caldwell . |
| 4,014,184 | 3/1977 | Stark .................................... 464/181 |
| 4,171,626 | 10/1979 | Yates et al. ........................ 464/181 |
| 4,238,540 | 12/1980 | Yates et al. . |
| 4,279,275 | 7/1981 | Stanwood et al. . |
| 4,663,819 | 5/1987 | Traylor ................................ 464/181 |
| 4,706,364 | 11/1987 | Aubry . |
| 5,230,661 | 7/1993 | Schreiber et al. ................... 464/181 |
| 5,261,991 | 11/1993 | Zackrisson et al. ................. 464/181 |
| 5,601,493 | 2/1997 | Nikazono et al. ................... 464/181 |
| 5,632,685 | 5/1997 | Myers .................................. 464/179 |
| 5,683,300 | 11/1997 | Yasui et al. ......................... 464/181 |

FOREIGN PATENT DOCUMENTS

| | | |
|---|---|---|
| 0547379A2 | 6/1993 | European Pat. Off. . |
| 0800007A2 | 10/1997 | European Pat. Off. . |

(List continued on next page.)

OTHER PUBLICATIONS

XP992955525, Derwent Publications, Ltd., Dec. 2, 1992.
Patent Abstracts of Japan, Jul. 19, 1994, 06200951A., Joint Method foe Driving Force Transmission Shaft made of FRP with Pipe Made of FEP.
Search Report, Feb. 13, 1998, Europe.
ATZ Automobiltechnische Zeitschrift, vol. 96 (1994), pp. 612–617, W. Hoffman, et al. "Die zweite Generation von Faserverbund–Kardnwellen"[The Second Generation of Bonded–Fiber Drive Shafts].
ATZ Automobiltechnische Zeitschrift, vol. 91 (1989), pp. 149–152, W. Hoffman "Faserverbundwerkstoff im Antriebsstrang"[Bonded–Fiber Material in the Drive Train].
00205525, Derwent Publications, Ltd., Feb. 02, 1992.

*Primary Examiner*—Eileen Dunn Lillis
*Attorney, Agent, or Firm*—Evenson, McKeown, Edwards & Lenahan, P.L.L.C.

[57] ABSTRACT

A drive shaft with an endless-fiber-reinforced plastic tube made of a thermosetting plastic matrix material and with a joint-connecting body that is connected nonrotatably with a plastic tube by means of a pin inserted into the plastic tube. The drive shaft is intended to be capable of being manufactured universally in large quantities efficiently and in different lengths for use, and can also handle severe loads mechanically even at high operating temperatures. For this purpose, an internal layer with axially aligned fibers or fiber strands, preferably made of carbon, is provided in the plastic tube, on which at least one double layer with fibers arranged inclined symmetrically to the axial direction is applied. The plastic tube is provided internally with axially aligned profiling that remains constant over the entire length of the plastic tube and is formed of the matrix material, in the manner of a spline bore. The pin, provided on its outer circumference with a negatively shaped matching opposite profile, engages positively by a sliding fit or gentle press fit in the internal profile of the plastic tube. The pin is also secured in the plastic tube in the axial direction by gluing or by a locking connection using a snap ring.

20 Claims, 2 Drawing Sheets

FOREIGN PATENT DOCUMENTS

| | | |
|---|---|---|
| 2356245 | 6/1975 | Germany . |
| 2812916A1 | 9/1978 | Germany . |
| 2911167 | 10/1979 | Germany . |
| 2911213A1 | 10/1979 | Germany . |
| 2951399A1 | 7/1981 | Germany . |
| 3007896C2 | 9/1981 | Germany . |
| 3115328A1 | 11/1982 | Germany . |
| 8222839 U | 5/1983 | Germany . |
| 3341368 | 9/1984 | Germany . |
| 3428327A1 | 2/1986 | Germany . |
| 0318818B1 | 6/1989 | Germany . |
| 3821549 | 12/1989 | Germany . |
| 4119359 | 1/1992 | Germany . |
| 4207839 | 9/1993 | Germany . |
| 4333988 | 4/1994 | Germany . |
| 4322236 | 1/1995 | Germany . |
| 2127938 | 4/1984 | United Kingdom . |
| 2178820 | 2/1987 | United Kingdom . |

DRIVE SHAFT WITH REINFORCED PLASTIC TUBE AND A JOINT-CONNECTING BODY CONNECTED NONROTATABLY ENDWISE

BACKGROUND AND SUMMARY OF THE INVENTION

This application claims the priority of Germany application number 196 13 851.4-12 filed in Germany on Apr. 6, 1996.

The invention relates to a drive shaft with an endless-fiber-reinforced plastic tube having a constant diameter over its entire length, made of a thermosetting plastic matrix material and with a joint-connecting body that is nonrotatably connected with the plastic tube by a pin inserted into the plastic tube. Such a drive shaft is known for example from an article in the German periodical ATZ Automobiltechnische Zeitschrift, Volume 96 (1994), pages 612–617, W. Hoffman et al., "Die zweite Generation von Faserverbund-Kardanwellen" [The Second Generation of Bonded-Fiber Drive Shafts]. In an earlier issue of the same periodical, ATZ Automobiltechnische Zeitschrift, Volume 91 (1989), pages 149–152, there is another article by W. Hoffman entitled "Faserverbundwerkstoff im Antriebsstrang" [Bonded-Fiber Material in the Drive Train], in which the author describes the "first generation" of bonded-fiber drive shafts.

These drive shafts have an endless-fiber-reinforced plastic tube with a constant diameter over its entire length and, at least in the second generation, a joint-connecting body made of short-fiber-reinforced plastic, said body being nonrotatably glued to the plastic tube by a pin inserted into the plastic tube. The circumference of the pin shown is provided with grooves running axially to receive adhesive, said grooves being closed axially at the free end of the pin by a circumferential bead. Reference can be made to European Patent Document EP 318 818 B1 in connection with the design of the connection as determined by gluing. The inner surface of the plastic tube is smooth because of the manufacturing process (the fibers are inclined at approximately 10° to 120° to the axial direction). The maximum load on the drive shaft is determined by the adhesive bond and by the maximum temperature that develops during vehicle operation. The maximum load values mentioned in the reference cited are approximately 3300 Nm at room temperature and approximately 2900 Nm at 100° C.

On the basis of observations by the inventors, however, higher temperatures do develop and, at least in heavy and/or more powerfully engined automobiles, higher torques as well. The basis for this in particular is the case of a so-called jackrabbit start, sudden engagement of the clutch with the engine running at high rpm, which imposes a very high torque shock on the drive shaft. Depending on the size of the engine and the weight of the vehicle, peak torques of more than 2500 Nm can definitely occur in such cases. This jackrabbit start load must also be accepted when the drive shaft has been heated to an extreme degree. The inventors have observed surface temperatures on parts of the engine of 160° C. in the immediate vicinity of the drive shaft. Because of these loads on the drive shaft, which are high although not conventional, yet cannot be ruled out in individual cases and are therefore possible, the inventors and the assignee of this application have not been able to select such shafts for drive shafts using a bonded-fiber design for functional reasons, despite their advantages as regards weight savings and acoustics. Apart from this, glued connections of the type under discussion that are subjected to high mechanical stresses are not free of problems as far as manufacturing is concerned, in other words such glued connections cannot be guaranteed by process engineering because, even if every precaution is taken, the possibility can never be completely ruled out that during mass production contamination or air inclusions can enter the joint unnoticed in individual cases and can then seriously affect the load-carrying capacity of the glued joint.

It is also known, as in German Patent Document DE 29 11 213 A1 for example, to wind fiber-reinforced plastic tubes for drive shafts from resin-saturated fiber strands or fabric webs and thus to shape the tube ends in a particular way, and to integrate metal end fittings into the ends of the tube in a positive manner, which fittings can then be welded to joint flanges. Application of force in this way means that the plastic tube can handle much higher mechanical loads. Glass or carbon fibers can be used for this purpose. On the winding core, a sleeve slotted lengthwise on its exterior is slid on endwise to a specific position and wound with the layers, but the end of the sleeve is left protruding from the layers. During winding, internally slotted shell parts that fit together to form another sleeve are inserted between two adjacent individual layers in such fashion that the grooves of the shell parts match the beads of the inner sleeve in shape and position, deforming the layers enclosed between the two meanderwise. This deformation disappears at the cylindrical wall of the tube because its shape tapers toward the plastic tube. After winding the layers to form a tube that is still soft and then incorporating the metal parts into the ends of the tube, the plastic is cured so that the metal parts are firmly secured at the tube ends and most importantly are bonded positively with the material.

A similar technology is found is U.S. Pat. Nos. 4,238,540 or 4,279,275 in which, in the vicinity of the tube ends, two sleeves with internal and external sinusoidal profiles are placed on the still-soft layers of the winding and the winding is shaped sinusoidally in the area enclosed by the sleeves, and a positive connection is formed between the windings and the sleeves. Then the matrix plastic together with the metal sleeves is cured by heat, thus creating a material bond between them.

The disadvantage of this prior art is that the tubes must be manufactured individually, which is not only cumbersome and too expensive for mass production but also makes it necessary to use different manufacturing devices for making shafts of different lengths. Hence this type of manufacture is not efficient and not universal. Apart from the disadvantages related to manufacture recited above, a bonded shaft with metal parts integrated endwise also has the functional disadvantage that at the transition from the metal to the fiber-reinforced plastic, there is a discontinuity in the rigidity because of the different strengths and moduli of elasticity of the materials involved, which can lead to play during operation.

Finally, the-bonded-fiber drive shaft according to German Patent Document DE 30 07 896 C2 should be mentioned, in which the pin of the metal joint-connecting body is provided on the outer circumference with a delicate profile directed outward. To fit the joint-connecting body to the previously cured plastic tube, the pin is forced into the plastic tube which has a smaller inside diameter, whereupon the endwise sharp-edged profile digs axially into the tube wall and creates a matching profile for itself in the tube. On the outside, a bandage is applied to the tube end to prevent the tube wall from expanding radially. Although this connection can handle high static and dynamic loads even at elevated temperatures, this rotationally rigid connection is difficult to manufacture, and an undesired discontinuity in rigidity can develop between the end of the tube and the joint-connecting body. This discontinuity in rigidity would be eliminated if the metal joint-connecting body were replaced by one made of plastic but the latter, because of an unavoidable tendency of plastic to creep under tension, especially at elevated temperatures, would loosen within the bond so that such a drive shaft would not be able to handle loads.

For the sake-of completeness, we should also mention some references that deal with the pulling and winding method, or pull/winding method, of interest here for manufacturing multilayered endless-fiber-reinforced plastic tubes. German Patent Document DE 29 51 399 A1 for example describes a system and a method for making such tubes, with carbon fibers being used in particular. The fiber-reinforced plastic tubes are intended as raw materials for athletic equipment and also as hollow sections for building machinery. Also, according to the method and device described in German Patent Document DE 28 12 916 A1, plastic tubes preferably reinforced with carbon fibers are made that are intended to be used as shafts in machines that rotate at high speed.

A goal of the invention is to improve the drive shaft according to the species in such fashion that it can be manufactured efficiently in large numbers and can be used universally in various required lengths, and that it can also handle loads even at temperatures above 140° C. that are higher than known drive shafts of comparable design can handle, on other words it also meets high demands on function.

This goal is achieved in the drive shaft according to the species that forms the basis of the invention by providing an arrangement wherein the plastic tube is a multilayer plastic tube which contains an inner layer with axially directed fibers or fiber strands on which at least one double layer with fibers or fiber strands inclined symmetrically to the axial direction is applied, the plastic tube being provided internally with axially aligned profiling that remains constant over the entire length of the plastic tube and being formed of matrix material and axially aligned fibers or fiber strands in the manner of a spline bore, and wherein the pin is provided at its outer circumference with a negatively shaped matching profile which engages positively with the axially aligned profiling of the plastic tube. Because of the axial alignment of the inner layer fibers, during the manufacturing process an internal profile can be formed over the entire length of the tube, into which the pin of a joint-connecting body can be inserted positively without significant forcing. To manufacture the plastic tube, it is possible, but not necessary, to use a continuous manufacturing process known of itself, namely the pulling and winding method, also called the pull/winding method, with which a quasi-endless plastic tube can be manufactured efficiently with a high level of productivity, from which the desired lengths can then be cut for use. The positive connection enables the torque connection in the area of the tube ends to handle high loads even at high temperatures. Thanks to the slide fit as well as the gentle press fit of the plug connection, high permanent stresses do not develop and consequently there is no creep, so that plastic can readily be used as the joint-connecting body. This results in a considerable savings in weight.

Other objects, advantages and novel features of the present invention will become apparent from the following detailed description of the invention when considered in conjunction with the accompanying drawings.

DETAILED DESCRIPTION OF THE DRAWINGS

Figure 1:
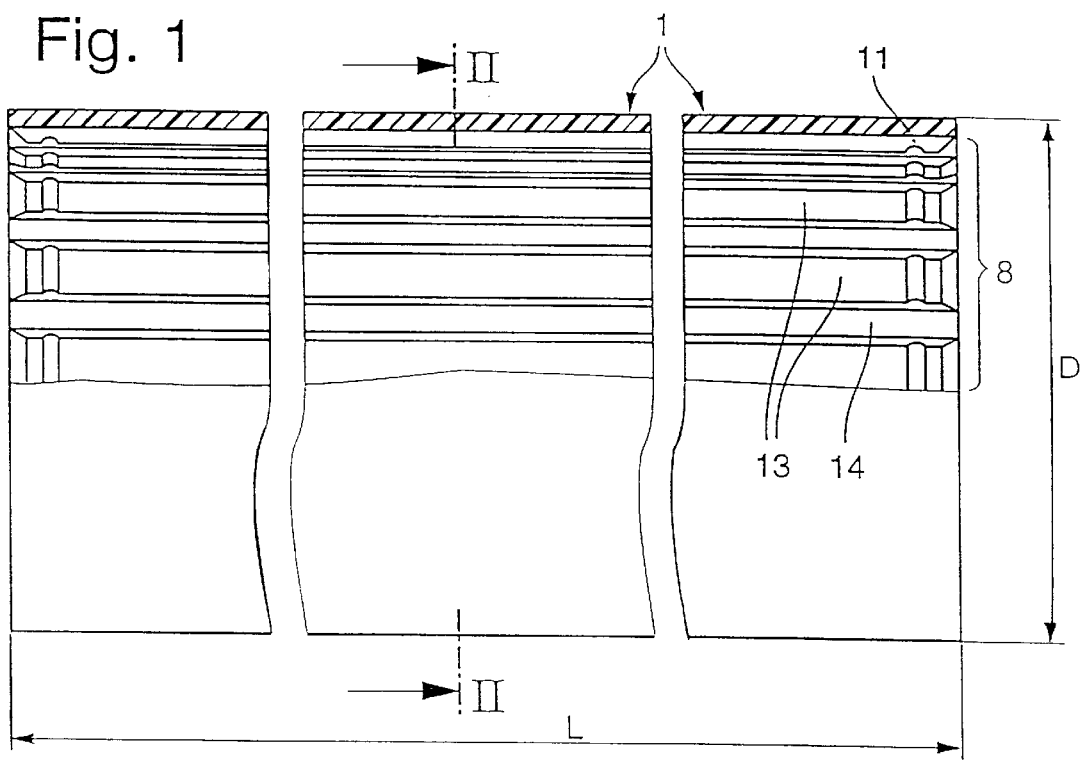
FIG. 1 shows a lateral sectional view through, or of, a first embodiment of a plastic tube for a drive shaft according to the invention.

Plastic tube 1 for a drive shaft, shown in FIG. 1, is reinforced with endless fibers or endless-fiber strands, so-called rovings 3 and 5, which are embedded in a thermosetting plastic matrix material. The plastic tube has the same diameter D over its entire length L and therefore offers the geometric possibility of making the tube efficiently in a continuous, quasi-endless method according to the known pulling/winding or pull-winding method, which is not only efficient and economical but also offers the possibility, without significant re-equipping and investment expense, of being able to produce any required length of plastic tube. Even plastic tubes with different diameters can be produced following a certain amount of re-equipping effort that can be accomplished quickly. To make a drive shaft, plastic tube 1 is nonrotatably connected at its ends with a joint-connecting body 6, with this torque connection being effected by a pin 7 inserted into the plastic tube.

The purpose of the invention is to make the connection able to bear high loads mechanically even at elevated temperatures. For this purpose, multilayer plastic tube 1 is first provided with an inner layer 2 with axially directed fibers 3, onto which at least one double layer 5 is applied, with fibers 5 inclined symmetrically at an angle $\pm\alpha$ to the axial direction. Axially aligned fibers 3 increase the bending stiffness of the plastic tube, which is especially important for the drive shaft to be suitable for high rotational speeds. Fibers 5 inclined at an angle lend the plastic tube a high torsional resistance, which is required for transmitting torque. Of course it is also possible if necessary to provide another double layer in the plastic tube, known in the field as a plus/minus layer, with fibers arranged at an angle, in other words a total of two double layers with fibers inclined differently. The number of double layers and the required angle of inclination $\pm\alpha$ of the fibers within the double layers is determined as a function of the specified loading data of the individual application in accordance with design criteria normal in the field. In the case of two double or plus/minus layers it can be advantageous for example to wind the fibers or fiber strands in the inner double layer at a small angle in the range from 3° to 15° and to wind them at a larger angle of inclination of 30° to 75° in the outer double layer.

In order to transmit the torque from the end of the plastic tube into the joint-connecting body 6 under high loads, the plastic tube is provided internally over its entire length L with axially directed constant profiling 8 in the manner of a spline bore profile, formed by the matrix material and possibly by axially aligned fibers or fiber strands laid down therein. This profiling is easy to do from the processing standpoint and does not require any special treatment of the tube ends; the profiling is available at any axial position along the plastic tube and makes it possible to make tube lengths as desired. Pin 7 is provided at its outer circumference with a corresponding negatively shaped matching profile 9 that positively engages internal profiling 8 of the plastic tube. The pin is fitted to the profiling of the plastic tube by means of its profiling 9, with a sliding fit or in any case a gentle press fit. The fit between the pin and the plastic tube must be chosen so that good centering, i.e. with zero play, is obtained between the parts that are fitted together to avoid uncontrolled imbalances and also so that no significant permanent stresses develop because of a seat being too tight, which would lead to creep of the plastic parts fitted together. As already mentioned, it is advantageous to avoid a sudden discontinuity in rigidity at the point where the force is applied and of course, for weight reasons, for joint-connecting bodies 6 to be likewise made of plastic, specifically fiber-reinforced plastic.

Figure 2:
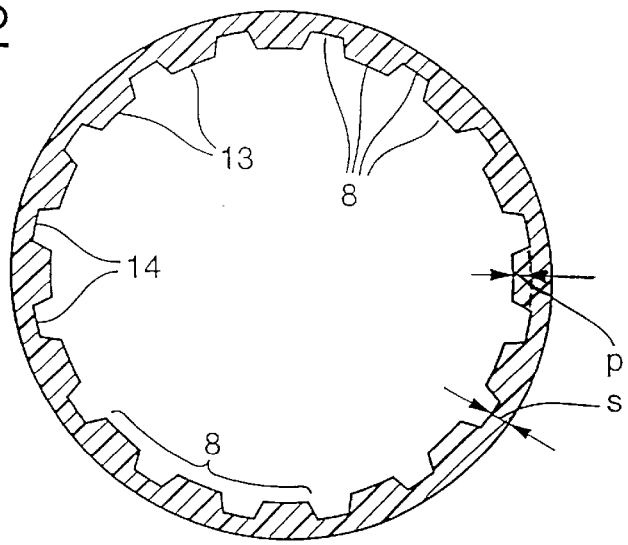
FIG. 2 shows a cross section through the plastic tube in FIG. 1.
Figure 3:
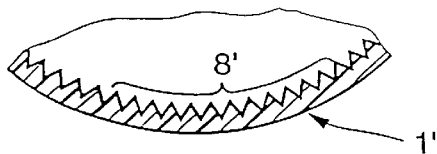
FIGS. 3 and 4 show two partial cross sections through modifications of a plastic tube with different internal profiles.
Figure 4:
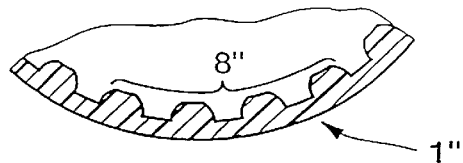

Different cross-sectional shapes can be provided for the other corresponding profilings 8 and 9, as indicated in FIGS. 2, 3, or 4. The profiling 8 of plastic tube 1 as shown in FIG. 2, looking in an unwound stretched position, has trapezoidal beads 13 as well as grooves 14 shaped approximately the same that have a relatively large circumferential division while profiling 8' of tube 1' in FIG. 3 is determined by narrowly divided triangular beads or grooves. Both profile shapes, viewed in cross section, have straight-line profile flanks. The other embodiment shown in FIG. 4 of a more coarsely divided profiling 8" in cross section has convexly curved profile flanks. Relative to the wall thickness s of the plastic tube measured at the deepest point in a groove 14, the profiling in the radial direction—dimension p—can vary as much as 33 to 100%. Based on the total wall thickness of the plastic tube measured over beads 13, the radial height p of the profiling is approximately 25 to 50%.

Within the framework of the design, glass fibers, carbon fibers, or aramid fibers can be used for the individual layers, with these fiber materials also possibly being used mixed within one layer. Preferably however it is recommended to insert carbon fibers exclusively into the matrix material of plastic tube 1 as endless fibers 3 and 5 in all layers 2 and 4, because fibers of this material have a modulus of elasticity that is many times higher than that of glass fibers, and by choosing carbon fibers the rigidity of the plastic tube can be increased several times by comparison with a glass-fiber plastic tube of similar design. A fiber volume component of 60 to 70% is desirable, at which such a fiber bond reaches its highest strength. Various curable synthetic resins can be used as matrix materials, but epoxy resin is used particularly frequently in connection with fiber-reinforced plastic tubes because of its favorable properties.

Figure 5:
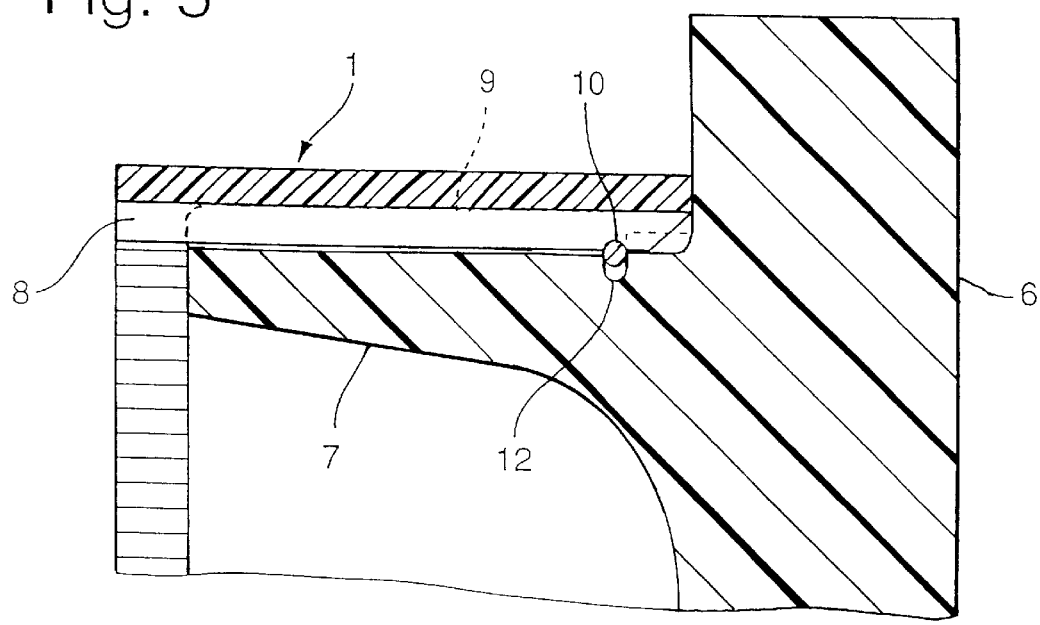
FIG. 5 shows a partial section through the axial mechanically secured connection between the end of the plastic tube in FIG. 1 and a joint-connecting body.
Figure 6:
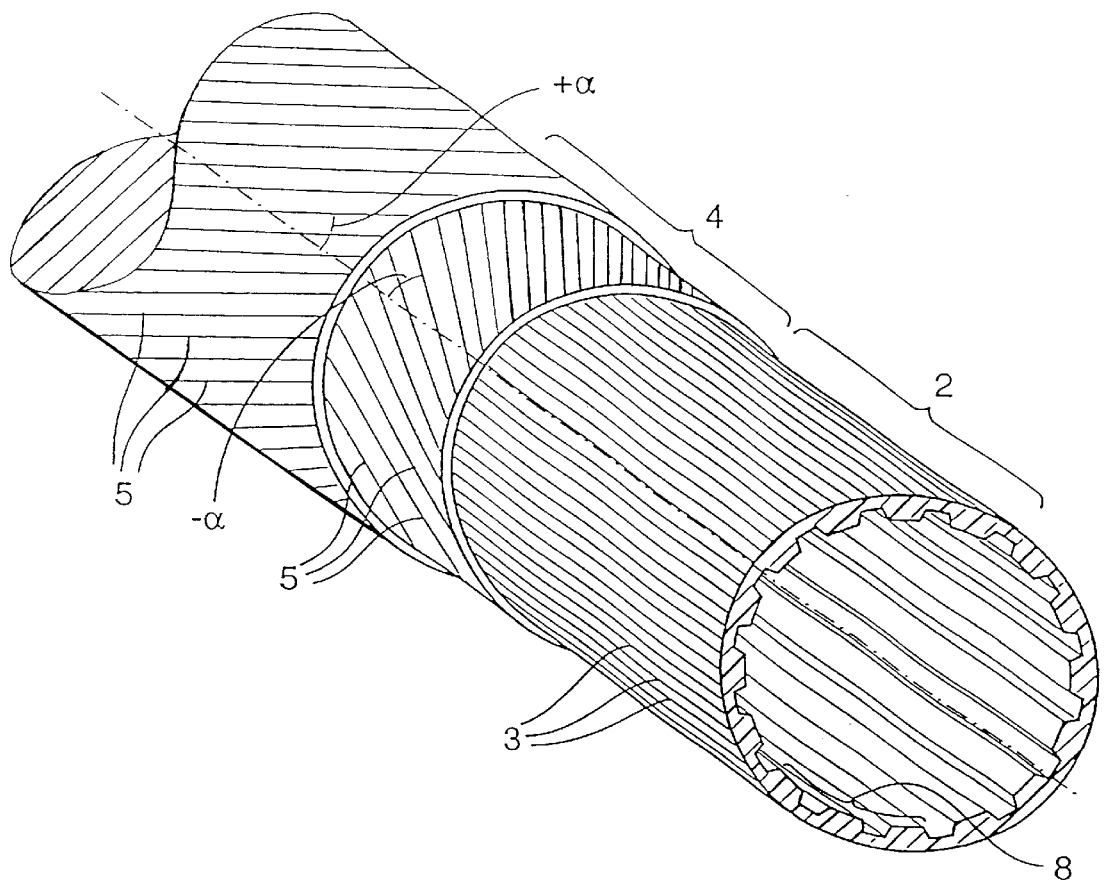
FIG. 6 shows a perspective view of the individual layers and their fibers in the plastic tube.

Regardless of positive rotational protection, the pin is also secured in the axial direction in plastic tube 1, with the pin being fitted into the tube end only by a sliding fit or gentle press fit. This axial locking can be effected mechanically for example by a latching connection shown in FIG. 5, using a snap ring 10 that fits circumferential groove 11 in plastic tube 1 and a circumferential groove 12 of the pin. Pin groove 12 has an inside diameter that is smaller by at least the wire diameter than the inside diameter of snap ring 10 when installed, so that the snap ring can engage inward radially when installed. Before the joint body is mounted, the snap ring is placed in groove 12 and then the pin with its profiling is pushed axially into the profiling of the plastic tube. Beads 13 of the tube profiling are beveled outward endwise and press the snap ring radially inward elastically when pushed in, so that they "lift" it radially onto the inside of bead 13. As soon as the snap ring has reached the axial position of circumferential groove 11 of the plastic tube, ring 10 again snaps back and mechanically locks tube 1 and pin 7 to keep them from pulling apart axially.

The axial locking process can be accomplished instead by using gluing for example. Although there are sufficiently known and suitable adhesives and gluing methods for gluing plastic parts, it appears to be especially advantageous in the present case to use a two-component adhesive for the purpose, whose two components are contained in microencapsulated form on at least one of the contact surfaces, preferably the pin. The microencapsulated two-component adhesive, which is already applied by the manufacturer of the joint-connecting body for example, forms a dry nonslip coating on profile 9 of the pin, which has a certain mechanical resistance and shelf life and makes the joint-connecting body, after being prepared for gluing, capable of being transported and handled. To fit the joint-connecting body to the plastic tube, the pin with its profiling is pushed axially into the profiling of the plastic tube by applying force. Because of the shear stress this imposes on the adhesive coat, the microcapsules are automatically broken so that the two adhesive components mix with one another as the pin is pushed in, and then the adhesive bonds. It should be mentioned in this connection that gluing to prevent axial movement under the influence of torque is not claimed and consequently does not have to meet the high quality claims imposed on a torque-transmitting glued connection between the joint-connecting body and the plastic tube.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle drive shaft comprising:
    an inner tube layer formed with axially aligned fibers, radial inner surfaces of said inner tube layer including axially extending spline structure,
    a first double layer surrounding the inner tube layer and formed of respective symmetrically oppositely inclined fibers,
    thermosetting plastic material embedding the inner tube layer and first double layer,
    and a splined pin part inserted into and axially fixed to the inner tube layer.

2. Motor vehicle drive shaft according to claim 1, comprising a second double layer surrounding the first double layer and formed of respective symmetrically oppositely inclined fibers, said second double layer being also embedded in the thermosetting plastic material.

3. Motor vehicle drive shaft according to claim 2, wherein the fibers of said first double layer are inclined at first similar respective opposite angles with respect to an axial direction of said drive shaft,
    wherein the fibers of said second double layer are inclined at second similar respective angles with respect to said axial direction of said drive shaft,
    and wherein said first and second angles are different from one another.

4. Motor vehicle drive shaft according to claim 3, wherein said first angles are ±3° to 15° with respect to the axial direction, and
    wherein said second angles are ±30° to 75° with respect to the axial direction.

5. Motor vehicle drive shaft according to claim 4, wherein said fibers are all carbon fibers and said thermosetting plastic material is epoxy resin.

6. Motor vehicle drive shaft according to claim 4, wherein said pin part is made of plastic and is connected to the inner tube by gluing.

7. Motor vehicle drive shaft according to claim 1, wherein said fibers are all carbon fibers and said thermosetting plastic material is epoxy resin.

8. Motor vehicle drive shaft according to claim 1, wherein said pin part is made of plastic and is connected to the inner tube by gluing.

9. Motor vehicle drive shaft which is axially connectable with a splined counterpart, comprising:

- a first tube layer formed with axially aligned fibers, radial surfaces of the first tube layer including axially extending spline structure,
- at least one further layer concentric to the first tube layer and formed of inclined fibers, and
- thermosetting plastic material embedding the first tube layer and the at least one further layer.

10. Motor vehicle drive shaft according to claim 9, wherein the at least one further layer comprises a second tube layer formed of respective symmetrically oppositely inclined fibers, the second tube layer being also embedded in the thermosetting plastic material.

11. Motor vehicle drive shaft according to claim 10, wherein the fibers of the first tube layer are inclined at first similar respective opposite angles with respect to an axial direction of said drive shaft,

- wherein the fibers of the second tube layer are inclined at second similar respective angles with respect to said axial direction of said drive shaft,
- and wherein said first and second angles are different from one another.

12. Motor vehicle drive shaft according to claim 11, wherein said first angles are 3° to 15° with respect to the axial direction, and

- wherein said second angles are 30° to 75° with respect to the axial direction.

13. Motor vehicle drive shaft according to claim 12, wherein said fibers are all carbon fibers and said thermosetting plastic material is epoxy resin.

14. Motor vehicle drive shaft according to claim 9, wherein said fibers are all carbon fibers and said thermosetting plastic material is epoxy resin.

15. Motor vehicle drive shaft which is axially connectable with a splined counterpart, comprising:

- a first hollow tube layer formed with axially aligned fibers, radial surfaces of the first tube layer including axially inward extending spline structure,
- at least one further layer surrounding the first hollow tube layer and formed of inclined fibers, and
- thermosetting plastic material embedding the first hollow tube layer and the at least one further layer.

16. Motor vehicle drive shaft according to claim 15 wherein the at least one further layer comprises a second tube layer formed of respective symmetrically oppositely inclined fibers, said second tube layer being also embedded in the thermosetting plastic material.

17. Motor vehicle drive shaft according to claim 16, wherein the fibers of the first hollow tube layer are inclined at first similar respective opposite angles with respect to an axial direction of said drive shaft,

- wherein the fibers of the second tube layer are inclined at second similar respective angles with respect to said axial direction of said drive shaft,
- and wherein said first and second angles are different from one another.

18. Motor vehicle drive shaft according to claim 17, wherein said first angles are 3° to 15° with respect to the axial direction, and

- wherein said second angles are 30° to 75° with respect to the axial direction.

19. Motor vehicle drive shaft according to claim 18, wherein said fibers are all carbon fibers and said thermosetting plastic material is epoxy resin.

20. Motor vehicle drive shaft according to claim 15, wherein said fibers are all carbon fibers and said thermosetting plastic material is epoxy resin.

\* \* \* \* \*